Feb. 7, 1933.   C. G. HAWLEY   1,896,894
CENTRIFUGAL FIXTURE
Filed Sept. 2, 1927   3 Sheets-Sheet 1

Inventor
Charles G. Hawley.
By
Attorney

Feb. 7, 1933.  C. G. HAWLEY  1,896,894
CENTRIFUGAL FIXTURE
Filed Sept. 2, 1927  3 Sheets-Sheet 2

Inventor
Charles G. Hawley
By C. A. Mason
Attorney

Feb. 7, 1933.  C. G. HAWLEY  1,896,894
CENTRIFUGAL FIXTURE
Filed Sept. 2, 1927  3 Sheets-Sheet 3

Inventor
Charles G. Hawley.
By
Attorney

Patented Feb. 7, 1933

1,896,894

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

CENTRIFUGAL FIXTURE

Application filed September 2, 1927. Serial No. 217,133.

In all processes of distillation and evaporation and throughout the arts of fluid purification and rectification by means of separators, it is both assumed and desired that the fluid evolved or treated shall leave the drum or container in a pure state, free from foreign substances, such as heavier fluids, liquids and solids. But as a rule, the conditions controlling and modifying the operation, in some measure defeat this primary expectation and purpose, and eventuate in producing or permitting the escape of impure fluids.

The present invention comprises a centrifugal fixture; that is, a device which does not itself move or rotate, but nevertheless reliably induces a strong centrifugal action within the escaping or discharged fluid and whereby the foreign susbtances are certainly and definitely removed from the flowing or escaping fluid, and either returned to the container or discharged externally if it be desired to rid the container thereof.

The objects of the invention are to perfect such processes of purification and to provide the simplest and most reliable device or apparatus for the performance of the perfected process. These and other objects, and the specific character of the invention, will presently appear in further detail.

The invention will be readily understood on reference to the drawings that form a part of this specification, in which.

Figures 1, 2, 3:
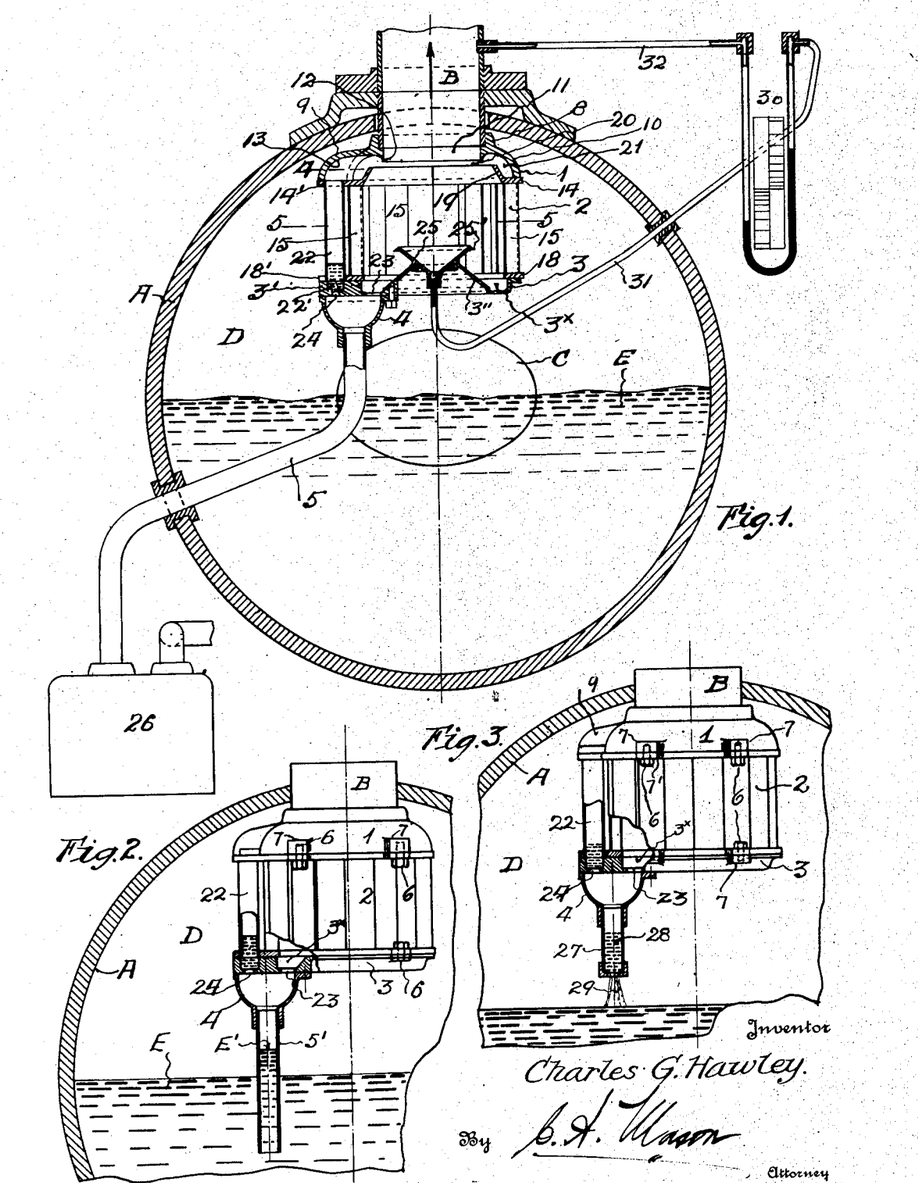
Fig. 1 is a vertical section of a steam boiler, drum or the like equipped with a centrifugal fixture embodying this invention.
Fig. 2 shows how the detrained liquid may be returned to a point below the level of the liquid in the container.
Fig. 3 is a similar view illustrating the return of the detrained liquid into the vapor space above the liquid level.
Figure 4:
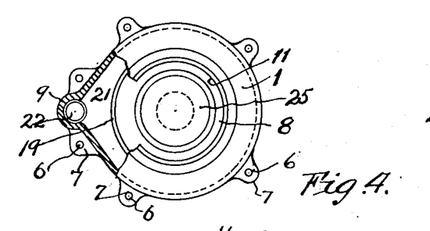
Fig. 4 is a top view of the fixture shown in Fig. 1, partly in section on the line 4—4 of Fig. 1.
Figure 5:
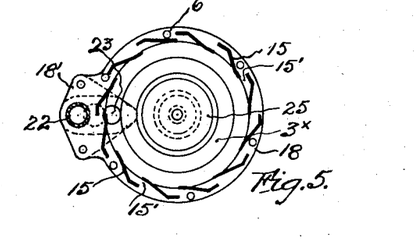
Fig. 5 is a section on the line 5—5 of Fig. 1.
Figure 6:
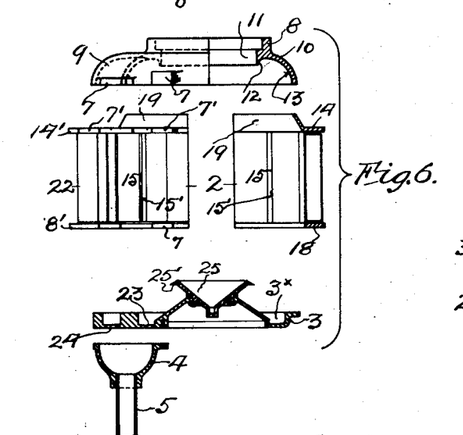
Fig. 6 shows the fixture of Fig. 1 in dismembered condition.

The drum A of Fig. 1 may be taken to represent the liquid-and-vapor container of any distilling or evaporating apparatus; for example, the steam and water drum of a steam boiler. The connection B represents the vapor outlet or nozzle of the container. The centrifugal fixture of this invention is fixedly supported or suspended directly beneath and in commuunciation with the outlet or nozzle B.

The novel fixtures of Figs. 1 to 9 in general, take their dimensions from the diameter and cross-sectional area of the nozzle B or other outlet to be served. In many cases the fixtures are small enough to be introduced intact (save for piping) through the manhole C of the container. In other cases, the fixture is made up in parts or sections (which take their dimensions from the size of the manhole C) and the fixture, introduced in dismembered form, is assembled within the container. Such a sectional fixture has been chosen for illustration in Fig. 1 and the construction thereof will be quickly understood upon comparisons of Figs. 1 and 6. Generally such a fixture comprises the four main parts 1, 2, 2 and 3, together with the bolts which are used for fastening them together. The part 1 is the top member of the fixture and is usually permanently connected with the nozzle B. The parts 2—2 are the two halves of the barrel-like, annular tuyère constituting the middle member of the fixture. It is to be understood that this tuyère is made in two or more sections only when the sectional construction is a necessary convenience in the matter of placing the fixture within the container. Otherwise the tuyère may be a unitary part. The part 3 comprises the floor, bowl or bottom of the fixture. The part 4 is a convenient connection employed between the fixture proper and the pipe 5 which carries away the detrained liquid. The few bolts required for rigidly joining the parts 1, 2 and 3 are indicated at points 6 in Figs. 2, 3 and 4. When assembled and connected for use the parts occupy the relations shown in Fig. 1.

But for the presence of the novel apparatus comprising this invention, the vapor leaving the space D above the boiling liquid E would pass directly to the nozzle B. Instead, this fixture, though composed of parts all of which are stationary, that is, non-rotative, subjects the escaping vapor to a rapid whirling action and in consequence the entrained substances which are heavier than the vapor under treatment are effectively separated before the vapor reaches the outlet B.

The top member 1 is of generally circular form and is hollow. It is preferably a metal casting, so that all of its portions may be integral; i. e., it is provided with the ears 7 for the assembling bolts 6; with the upstanding part 8 by which it is joined to the nozzle B, and with the off-set eject nozzle portion 9. The member 1 is essentially a hollow ring of an inverted bowl-like form characterized by the downward and outward flaring wall 10 and by the smaller central orifice 11. The latter is of substantially the same diameter as the outlet B and is characterized by the down-turned pressure-effecting lip 12. The inner surface 13 of the ring 1 extends or curves outward and upward from the lip 12 and thence downward and outward, as most clearly shown in Fig. 6. The lower edges of the member 1 are finished off in a single plane and receive and make a tight joint with the top of the barrel-like tuyère 2.

Figure 7:
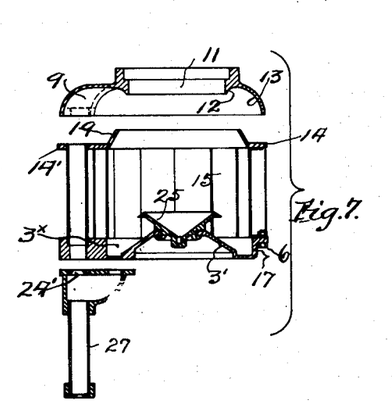
Fig. 7 is a view like unto Fig. 6 but illustrating several modifications in structure.

The present invention, which embraces various like structures by which the defined purposes may be attained comprehends the employment of tuyères, i. e., rotation inducing members, of differing constructions, but all generally typified by the unitary or sectional member 2 herein illustrated. Said member 2 as here shown, is made up of a top ring 14, a plurality of angularly or tangentially positioned tuyère blades 15 and a circular bottom member, which latter may be a ring 18 as shown in Figs. 1 to 6, or a combined ring and bottom 17 as shown in Fig. 7. The top ring 14 is provided with ears 7' matching the ears 7 of the member 1, and these are fastened together by the bolts 6. The circular or annular series of relatively or operatively overlapping tangential blades 15 join and are rigidly held by the top and bottom tuyère members. Thus in Fig. 1 the blades 15 are held by the top ring 14 and the bottom ring 18, while in Fig. 7 the blades 15 serve to rigidly connect the top ring 14 and the bottom member 17. As clearly shown in Fig. 5, the blades all have the same angularity and direction and the vapor entering from the exterior of the tuyère is set into rotation within the fixture. The inner edges of the blades 15 substantially conform to or meet an imaginary cylinder which is co-axial with the outlet orifice 11 and is of greater diameter. The top ring 14 of the tuyère is characterized by an upstanding flange 19, which comprises the accumulator or truncated cone member hereinafter mentioned. The inner surface of the member 19 is preferably conical; and preferably conforms to a truncated cone having a base of substantially the same diameter as the interior of the tuyère and a top which is of slightly greater diameter than the beforementioned pressure effecting lip 12 which defines the orifice 11 and wherewith the accumulator cone cooperates. The member 19 is of less height than the space beneath the lip 12 so that there remains between them a clear extended radial space or gap 20. The annular space 21 between the flange 19 and the surface 13 constitutes the top eject race of the fixture. Obviously the bottom of the race 21 is formed by the top ring 14 belonging to the tuyère member. Preferably the bottom ring 18 is provided with an ear or extension 18' corresponding to the nozzle portion 9 at the top of the fixture. These ears 14' and 18' serve to hold the eject or drain tube 22, through which the race 21 is emptied. (See Figs. 1, 4 and 5.)

As best shown in Figs. 1, 5, 6 and 7, the bottom member 3 of the fixture is preferably a bowl-like casting which provides a recess somewhat below the lower end of the tuyère. This casting, as before explained, is either bolted to the bottom ring of the tuyère or made integral therewith. In the bottom and at the periphery of the bowl member 3 is an eject or drain hole 23. Most conveniently the member 3 is provided with an extension 3' which corresponds to the part 18' on the tuyère, and which contains an extension 22' of the opening within the eject tube 22. Thus, the eject openings of the fixture are both presented in the bottom of the fixture where they may communicate directly with the detachable eject connection 4. The small opening 24 formed in the bottom member 3 at the lower end of the tube 22 is related to the use of the connecter 4, the relation and operation of which will be more fully explained hereinafter.

A strong central vortex is formed within the fixture and while centrifugal force tends to hold the downwardly spiraling heavier substances at the periphery of the floor of the fixture, the vortex exerts a strong force tending to carry such substances toward the axis of the fixture and upward, toward the orifice, at the center of the fixture. Particularly is this the case at moderate and low operating velocities, and is an adverse action which must be defeated if the fixture is to be adapted for proper operation at all velocities. Such adverse vortexial action is successfully defeated by the fixed centrifugal cup or member 25, which opens toward the orifice 11 and the upper part of which overhangs the bottom of the fixture. The member 25 is preferably an inverted cone and is co-axial with the orifice 11. It is fixedly supported from the central part of the bottom member 3, preferably by means of a truncated conical portion 3″ of the latter. This centrifugal cup or member 25 will be referred to as the reaction member and it performs several distinct reaction functions which are important. Being present in the bottom of the tuyère, the reaction member obstructs and tends to prevent the direct entrance of separated substances from the bottom of the fixture to the central portion of the vortex or whirling body of fluid within the fixture. The presence of the reaction member ensures a state of relatively higher pressure within the bottom of the tuyère, and thereby it is made possible to discharge the separated substances from the tuyère by gravity. And, further, the presence of this reaction cone or member opposite the orifice, results in a high centrifugal action within the cup of the reaction member, so that a small portion of substances that may pass the top margin thereof are first caught therein by an eddying action and then promptly ejected from the cone or member by centrifugal force, and being thrown outward within the tuyère, are positioned to be caught at either the top or bottom of the tuyère. Creepage across the edge of the member 25 is minimized by the down turned flange 25′ thereon. The effect of this vortex defeating element is very positive. In further explanation it may be pointed out that the small or stray quantities of substances which reach and pass the edge of the cone as the result of whirling motion toward the outlet orifice are caught in the void occasioned by the presence of the cone within the vortex, such particles being displaced inwardly by the streams of carrier fluid whirling toward the outlet. The individual particles, because of lack of mass, are intercepted and temporarily held on the inner margin of the conical cup; and, as the individual particles become agglomerated with others and attain sufficient mass they are centrifugally expelled from the inner margin of the cone, being still under the influence or impulsion of the vortex. Thus stray particles which escape accumulation during the major operation within the fixture and which might otherwise escape along the axis of the vortex are positively intercepted as they approach that axis and are centrifugally expelled toward and into the outer parts of the fixture, where they are absorbed into and disposed of along with the major accumulations or masses of separated substances.

As shown by the drawings, the dimensions of the reaction members, cups or cones, vary with the internal dimensions of respective fixtures. Experience indicates that the diameter of the open top of the reaction member should be substantially one-half the internal diameter of the tuyère, and that its height should reach a level at substantially one-fourth the distance between the bottom of the tuyère proper and the outlet orifice of the fixture. A reaction member of conical shape appears to produce the best results and to be most practical mechanically, but obviously the shape may be considerably modified without loss of the characteristic functions above defined.

The functions of the said reaction cone, to be appreciated, must be fully understood, and that element of this invention should not be confused with any of the conical parts hitherto employed in separators for causing the divergence of the fluid or carrier with relation to the orifice. The vortex nullifying and pressure creating effects of the present centrally positioned reaction cone are entirely new conceptions. Likewise, those cones of the prior art which are positioned with apex toward orifice, and which assist in the convergence of the stream upon the orifice or outlet, have no relation to this present invention.

It should be understood that the bottom of the fixture may be either flat or of the recessed, bowl-like form here shown. In either case it serves to support the central reaction cone 25, and in either case it contains one or more holes for the ejection of the collected substances. The preferred construction provides the downwardly recessed reception space or groove 3x beneath the base of the tuyère, and gives the fixture a considerable momentary capacity to hold slugs of material that may be thrown down within the tuyère and which could not instantly drain away through an opening 23.

Being of little altitude and being suspended from the top of the container it is obvious that the bottom of this centrifugal fixture is well removed from the agitated surface of the liquid in the container. Nevertheless, much liquid may be entrained by the rising vapor and must be intercepted by this fixture. The velocity of the emergence of the fluid at the nozzle, B, varies with the difference of pressure within and without the container. In practice, these velocities are high, and unless the vapor is allowed to enter the fixture very freely the difference of pressure between the main vapor space D and the interior of the fixture will prevent the successful return of the ejected substances to the interior of the container. Less difficulty is experienced with the eject when the separated substances are discharged upon the exterior of the container. But even in such cases it is desirable that the pressure drop through the fixture shall be low.

It may now be noted that the blades 15 form a series of tangential tuyère openings 15', each in the form of a long and narrow slot, but instead of adhering to a true tangential arrangement, the blades 15 diverge outwardly from the true tangent and provide tuyères of correspondingly greater width. By means of the thus widened tuyères, the longitudinal dimension (the height as here shown) of the tuyère is kept within reasonable limits; and in consequence of this facility a tuyère of little height is provided with an aggregate tuyère entrance or area which so far exceeds the area of the outlet orifice 11 as to insure a virtually unreduced pressure at said orifice. In other words, the admission of the gas or vapor to the tuyère is accomplished at the cost of a very slight drop of pressure within the fixture.

The tangentially overlapping manner in which the many streams of vapor enter the tuyère through the many tuyère openings results in setting the progressively contained body of vapor into rapid rotation and thereby the heavier substances are not only separated but are also retained upon the inner surface of the tuyère long enough to insure their spiral delivery to one or the other of the ends of the tuyère. Incidentally it is important to note that the obstruction which each entering stream of vapor offers to the next and relatively overlapping stream, is compensated, in the total, by the over-size of the tuyère as an avenue of approach to the orifice. In practice, the aggregate area of the tuyère openings not only actually exceeds the area of the orifice 11, but in most cases may nearly double that area; and, in cases having to do with very high velocities and dense fluids, should be more than double the area of the orifice of the fixture.

In any centrifugal fixture of this type the ultimate pressure drop through the fixture is measured, quite directly, by the difference between the internal diameter of the whirl-promoting element or tuyère (marked by the inner edges of the blades) and that of the outlet orifice, and is increased by an increase in such diameter difference. A distinct advantage of the present invention is that the accumulator ring or combining cone 19, obviates the need for an objectionable difference in these diameters and reduces the pressure drop by providing an easy approach to the outlet orifice and, as hereinafter described, by coacting to ensure the final separation of the impurities from the upper portion of the whirling column, in advance of the orifice.

The accumulation of impurities within the fixture depends upon the quantity present in the fluid passing therethrough. Such deposits take on the general whirling action of the body of vapor within the fixture. At low velocities and aided by the inward hanging top of the fixture, the centrifugally collected substances or impurities for the most part move helically downward and are received by the bowl-like bottom of the fixture; at moderate velocities of vapor passage, some of the centrifugally separated substances will spiral helically upward within the tuyère; and, at very high velocities, the greater portion of the separated substances will thus be carried upward, i. e., in the general direction of the flow toward the outlet orifice. Under both conditions of upward movement, the substances meet the accumulator or converging cone, which serves to restrict the pitch of the helical movement so that the film of collected substances is forced to adhere to the inner surface of the truncated cone and to continue to rotate thereon until the top of the truncated cone (19) is reached. Thereupon, under the co-action of the pressure-effecting lip (12), the substances which would otherwise escape through the outlet are centrifugally ejected into the race 21. To best effect the reception and retention of the substances in the race, the pressure therein must be kept as nearly as possible at a constant with that in the orifice 11. It is to this end that the described relation of the accumulator 19 and deflecting lip 12 was devised. The upward whirling rush of the vapor within the fixture meets with the opposition of the inwardly hanging and outwardly divergent portion of lip 12, and at the same time, due to the gap 20 between the parts 19 and 12, is freed radially. The action of the outer portion of the outgoing stream of gas or vapor may best be visualized as resembling the action of a stream on one-half of a Pelton wheel, but obviously, is modified by and includes a centrifugal disbursive action occasioned by the whirling condition of the outgoing stream. In consequence, the substances carried upon the outer periphery of the outgoing whirling body or column are successfully unloaded or permitted to escape into the race 21. The race is an uninterrupted annulus, but due to the angles of impact and the dissipation of the kinetic energy of that impact upon the inner wall 13 thereof, the rotation of the contents of the race is reduced. Thus, and by the actual capacity of the race as represented by the height of the part 19, it becomes possible to finally eject the substances from the race by gravity, instead of having to depend upon centrifugal force to evacuate the race. Nevertheless, as suggested at 33 and 34 in Fig. 8, both the race and the bowl portions of the fixture may be acceptably equipped with tangentially disposed eject nozzles or off-takes. A further and distinct advantage of the accumulator ring or cone 19 and the narrow gap 20 between the same and the orifice 11, lies in the fact that the uniform and uninterrupted discharge of the substances is insured at the top of the cone, notwithstanding the violation of the symmetry of the race by the off-take portion of the eject nozzle thereof. Another great advantage of this construction is that the pressure in the race 21 is made to so nearly equal the pressure in the main drum or container, that it becomes possible to discharge the collected impurities into the container by gravity.

Figure 8:
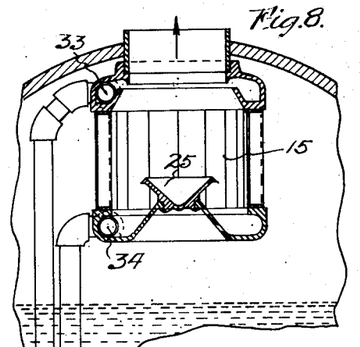
Fig. 8 illustrates a further modified form of the invention and incidentally shows that the bodies of detrained liquid or other foreign substance, collected at the top and at the bottom of the fixture, may be led away through independent pipes.
Figure 9:
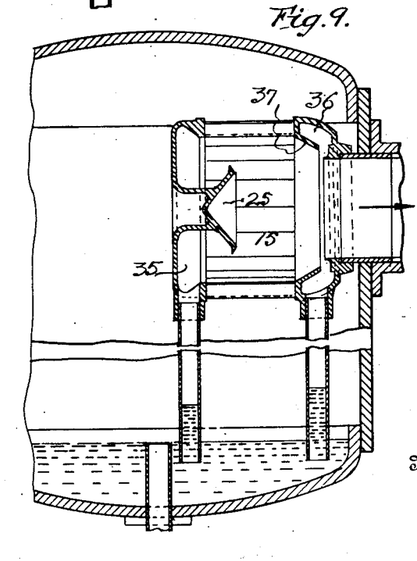
Fig. 9 is a vertical section illustrating the installation of the invention in a receiver drum of the kind which requires the fixture to be placed upon a horizontal axis.

When feasible, the top and bottom of the fixture may be emptied through separate eject pipes, as represented in Figs. 8 and 9. But in many cases it is better to have only one eject pipe for each fixture, and in such cases the connector 4 is employed. Obviously, such a device, when bolted to the bottom of the fixture, places the bottom eject hole 23 in cross-communication with the lower end of the top eject tube 22. While there are moments of operation (at certain high outlet velocities) when the pressures in the race 21 and the bottom 3x are the same or are greater in the top than at the bottom, it will be found that, as a rule, the eject pressure at the bottom of the fixture will slightly exceed the eject pressure in the top race. To prevent the back-circuiting or looping of the collected substances from bottom to top through the eject tube 22, a pressure compensator is provided. This pressure compensator is a very simple thing, comprising only the tube 22 and the smaller drain hole 24 defining the lower outlet thereof. The drain hole 24 is of "drop size", i. e., within practical limits its size is determined by the viscosity of the liquid to be discharged. The liquid pouring down from the top race is momentarily held in the tube 22 by the slight up-rush of vapor therethrough, such action continuing until the column accumulated in the tube 22 rises to a height which overcomes the difference in pressure within the tube 22 and the connector 4. Thereupon, the opening 24 is promptly closed by a hanging drop of the liquid, which later obviously is instantly displaced by the feeding of further liquid into the top of the eject tube 22. Thereafter, the velocity of liquid discharged from the opening 24 will be determined by the quantity of liquid reaching tube 22 from the race 21. Momentary excesses are temporarily compensated by an increase in the height of the column of liquid within the tube 22, which increase of hydraulic head results in the more rapid expulsion of the liquid through the restricted orifice 24. For want of a better name, the eject opening 24, which obviously may be applied to either eject hole of the fixture is called a water-check orifice. Actually, it constitutes a compensating valve, though it comprises only a single part and has no movable part. Such a compensating valve will again be referred to in connection with Fig. 8. Structurally, the water-check orifice 24 may be formed in the bottom part 3, as in Fig. 1; or, in the top of the cross-connecting part as shown at 24' in Fig. 7.

Upon reaching the connection 4 the ejected substances may be disposed of in one or the other of the ways suggested in Figs. 1, 2 and 3. As shown in Fig. 1, the pipe 5 leads to an external trap 26, preferably of the well known automatic type. As shown in Fig. 2, a drain pipe 5' leads downward to a point well below the level of the liquid in the container, which now becomes possible because of the means herein adopted to secure relatively high states of pressure in the spaces 21 and 3x at the top and bottom of the fixture. The relatively small drop of pressure between them and the main vapor space D is indicated by the elevated surface E' of the liquid within the drain tube 5'. Fig. 3 illustrates an automatic drain trap 27 involving the use of the above described water-check orifice and which permits the return or discharge of the ejected substances into the main vapor space D. That element of this invention while included herein, constitutes a separate invention which is fully described and specifically claimed in U. S. Patent No. 1,748,067, granted February 25, 1930. Its operation is characterized by the holding of a pressure equalizing liquid column 28 in the drain pipe 27. That balancing column prevents the upward passage of vapor into the bottom of the fixture but at the same time it permits the continuous discharge of liquid, as indicated by the dotted lines 29.

The apparatus marked 30 represents a typical flow meter connected with the described fixture and by which the varying quantity, i. e., volume and density, of the fluid passing through the main fluid outlet or nozzle B is continuously indicated. The meter is joined to the apex of the reaction cone 25 and to the nozzle B by respective pipes 31 and 32. The operation of the present invention results in effecting an extraordinary range of pressure differences between the nozzle B and the bottom of the fixture, which differences of pressure respond most accurately to variations in the vapor or other fluid passing through the nozzle B.

Fig. 9 is referred to as showing in particular that the terms top, bottom and sides of the fixture, as used in this specification and the appended claims are merely relative, the relation being in respect to the position of the main outlet or orifice. Due to the whirling action within the fixture, the effects of gravity are less noticeable than usual, and hence the fixture as a whole may be placed in any desired position; for example, upon a horizontal axis as shown in Fig. 9. The end containing the main outlet orifice is still considered to be the top of the fixture. In such cases it is desirable that the eject openings shall be at the then under side of the fixture, and to this end the bowl 35 may be advantageously deepened. Another difference may be noted in the race portion 36 which whatever the position of the fixture, may contain an accumulator 37 which is an integral part of the race member. Otherwise the proportions and characteristics of a horizontally positioned fixture remain the same as before described.

Figure 10:
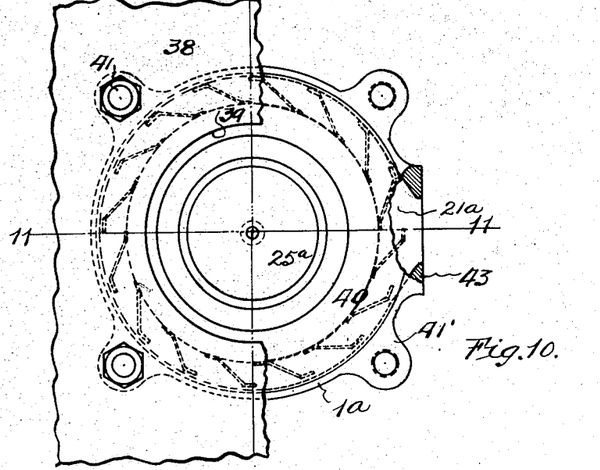
Fig. 10 is a plan view, partly in section, illustrating the device of this invention adapted for suspension from a floor or diagram as employed in receivers and locomotive domes.
Figure 11:
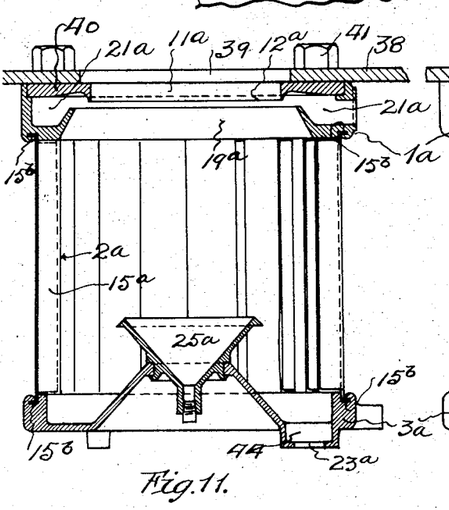
Fig. 11 is a vertical section thereof on line 11—11 of Fig. 10.
Figure 12:
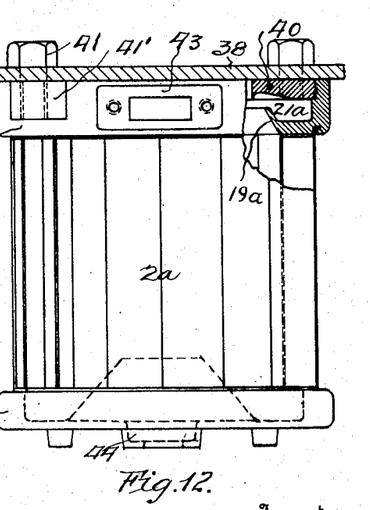
Fig. 12 is a side view of the fixture or unit.

In adapting these fixtures for suspension or support from floors or diaphragms within the limited confines of locomotive domes and line receivers, it is desirable to design the fixture within relatively restricted diameters after the manner illustrated in Figs. 10, 11 and 12. This in order that a plurality of such fixtures may be used in multiple within a single container. The part 38 represents the floor or diaphragm just mentioned, beneath which is the space containing the saturated steam or other gas, and above which is a space for the reception of the purified gas or vapor. The floor 38 contains a hole or passage 39, for each centrifugal fixture, with which the orifice 11a of the fixture registers. In this case the internal diameter of the tuyère 2a is very little greater than the diameter of the orifice 11a. This has the effect of reducing the heights of the accumulator cone 19a and of the race portion 21a. Preferably the part 19a is here integral with the part 1a, and the top of the race is closed by a separate ring 40 which contains the orifice 11a and is provided with the characteristic diverging lip 12a. One advantage is that the top ring 40 may be removed when it is desired to inspect or clean the race 21a. The fixture is suspended from the floor 38 by means of a plurality of bolts 41 which enter the ears 41' and the part 1a. Preferably the eject opening from the race 21a leads through the side of the part 1a, which side is flattened at 43 to receive the top eject pipe. The bottom 3a contains the characteristic reaction member 25a and is peculiar in that it contains an added sink or recess 44 at the eject hole 23a. The tuyère in this case is unified with the top and bottom castings by the employment of the pressed blades 15a and by fastening the foot flanges 15b of those blades directly to the top and bottom castings 1a and 3a, by clinching or bending the edges of the castings against the feet of the blades as best shown in Fig. 11. A fixture characterized by such blading may be of very light construction and yet is remarkably rigid and durable. The tuyère construction and method of blading tuyères here shown constitutes a separate invention which is specifically described and claimed in a companion application S. N. 236,709, filed November 30, 1927. The general operation of the fixture shown in Figs. 10, 11 and 12 is identical with that above described and need not be repeated.

The unitary tuyère which is illustrated in Figs. 1 to 9 is separately described and claimed in my companion application Serial No. 464,603, filed June 28, 1930.

It should be clearly understood that centrifugal fixtures of the kinds herein typified may be employed in variously shaped containers or casings and for sundry purposes involving the separation of any heavier substances from various carrier fluids. This invention is not limited to the detrainment of liquids and contained solids. Further, various modifications of these structures will readily suggest themselves to those who are skilled in the art, and it is to be understood that the invention is not limited to the specific disclosures hereof but is claimed broadly as follows:

I claim:

1. A centrifugal fixture for unburdening fluids, comprising in combination, a member containing an outlet orifice and having a pressure-effecting lip in advance of said orifice, an accumulator co-axial with and converging toward said lip but of slightly larger internal diameter and separated therefrom, means which cause the burdened fluid to approach said accumulator, lip and orifice vortically, the space between said lip and accumulator being formed to gather and eject burden received from the periphery of the vortex, and other burden ejecting means at the distant end of the fixture relative to said orifice.

2. A centrifugal fixture for unburdening fluids, comprising in combination, a member containing an outlet orifice and having a pressure-effecting lip in advance of said orifice, an accumulator co-axial with and converging toward said lip but of slightly larger internal diameter and separated therefrom, means which cause the burdened fluid to approach said accumulator, lip and orifice vortically, the space between said lip and accumulator being formed to gather and eject burden received from the periphery of the vortex, other burden eject means at the distant end of the fixture relative to said orifice and reaction means which co-act with said eject means and exclude burden from the axial portion of the vortex.

3. A centrifugal fixture for unburdening fluids, comprising in combination, a member containing an outlet orifice, means which cause the burdened fluid to approach said orifice vortically, means at both ends of said vortex inducing means for the ejection of the peripherally separated burden, and a vortex reactance cup spaced axially from the orifice and which opens toward said orifice and excludes burden from the axial portion of the vortex.

4. A centrifugal fixture for unburdening fluids, comprising in combination, a member containing an outlet orifice and containing a burden race, means which cause the burdened fluid to approach said orifice vortically, an eject duct external to said vortex causing means and depending from said race, a water-check orifice at the foot of said duct, a bottom member having an eject opening, a reaction cup on said bottom member, and, a drain common to said water-check orifice and said eject opening.

5. A centrifugal fixture comprising a top portion containing an axial orifice and a surrounding eject race, said orifice being defined by a pressure-effecting depending lip, in combination with a barrel-like tangential tuyère depending from said top portion and co-axial with said orifice, a bottom portion containing an eject groove, an accumulator ring having an open top slightly below and of larger diameter than said lip, said accumulator forming an extension of the top of said tuyère and converging toward said lip, and a co-axial cup-like reaction member positioned upon said bottom and opening upward into the lower part of said tuyère.

6. A centrifugal fixture comprising a top portion containing an axial orifice and a surrounding eject race, said orifice being defined by a pressure-effecting depending lip, in combination with a barrel-like tangential tuyère depending from said top portion and co-axial with said orifice, an accumulator ring having an open top slightly below and of larger diameter than said lip, said accumulator forming an extension of the top of said tuyère and converging toward said lip, and a co-axial cup-like reaction member opening upward into the lower part of said tuyère.

7. A centrifugal fixture comprising a top portion containing an axial orifice and a surrounding eject race, in combination with a barrel-like tangential tuyère depending from said top portion and co-axial with said orifice, an accumulator ring having an open top slightly below and of larger diameter than said orifice, said accumulator forming an extension of the top of said tuyère and converging toward said orifice, and a co-axial cup-like reaction member opening upward into the lower part of said tuyère.

8. A centrifugal fixture comprising a top portion, in combination with a barrel-like tangential tuyère, and a tuyère-bottom portion, said top portion containing an axial outlet orifice defined by a pressure-effecting depending lip, a suitably drained eject race surrounding the same, and a co-axial accumulator ring having an open top slightly below and of larger diameter than said lip and extending up and inward from said tuyère.

9. A centrifugal fixture comprising a top portion containing an axial orifice and an eject race surrounding the same, in combination with a barrel-like tangential tuyère co-axial with and attached to said top portion, and a cup-like reaction member rising within said tuyère.

10. A centrifugal fixture comprising a top portion containing an axial orifice and an eject race, the former defined by a depending lip and the latter having an eject opening, in combination with a barrel-like tangential tuyère attached to said top portion, an accumulator slightly below and of larger diameter than said lip and extending upward and inward from said tuyère, and a suitable tuyère bottom.

11. A centrifugal fixture, comprising a top portion containing an axial orifice, in combination with a whirl-promoting tuyère, a bottom portion, and a cup-like conical reaction member rising from said bottom and co-axially opening toward said orifice.

12. A centrifugal fixture for unburdening fluids, comprising in combination, a member containing an outlet orifice and having a pressure-effecting lip next in advance of said orifice, an accumulator co-axial with and converging toward said lip but of slightly larger internal diameter and separated therefrom, means which cause the burdened fluid to approach said accumulator, lip and orifice vortically, and the space between said lip and accumulator being formed to gather and eject burden received from the periphery of the vortex.

13. A centrifugal fixture for unburdening fluids, comprising in combination, a member containing an outlet orifice and having a pressure-effecting lip next in advance of said orifice, an accumulator co-axial with and converging toward said lip but of slightly larger internal diameter and separated therefrom; means which cause the burdened fluid to approach said accumulator, lip and orifice vortically, the space between said lip and accumulator being formed to gather and eject burden received from the periphery of the vortex, and reaction means which open toward said orifice and exclude burden from the axial portion of the vortex.

14. A non-rotative centrifugal separator for burdened fluid and for unburdening the same, comprising an element containing an outlet orifice, in combination with a whirl-promoting tuyère positioned endwise thereto, co-axial with and of larger internal diameter than said outlet orifice, the tuyère-end and element being rigidly united and together defining an annular race between the tuyère and orifice and provided with a burden eject passage, a bowl-like member rigidly united with and forming the other end of said tuyère, said bowl-like member forming an annular sink, and a burden eject passage leading from the peripheral portions of said member and sink.

15. A non-rotative centrifugal separator for burdened fluid and for unburdening the same, comprising an element containing an outlet orifice, in combination with a whirl-promoting tuyère positioned endwise thereto, coaxial with and of larger internal diameter than said outlet orifice, the tuyère-end and element being rigidly united and together defining an annular race between the tuyère and orifice and provided with a burden eject passage, a bowl-like member having a burden eject passage and rigidly united with and forming the other end of said tuyère, and a pressure effecting conical element fixed coaxially within and of less diameter than said tuyère and flaring toward said tuyère and orifice.

16. A non-rotative centrifugal separator for burdened fluid and for unburdening the same, comprising an element containing an outlet orifice, in combination with a whirl-promoting tuyère positioned endwise thereto, coaxial with and of larger internal diameter than said outlet orifice, the tuyère-end and element being rigidly united and defining a burden eject passage, pressure effecting means associated with such eject in advance of said orifice, a bowl-like member having a burden eject passage and rigidly united with and forming the other end of said tuyère, and pressure effecting means within said tuyère in operative advance of the latter eject passage.

In testimony whereof, I have hereunto set my hand this 31st day of August A. D. 1927.

CHARLES GILBERT HAWLEY.